United States Patent [19]

Abbey et al.

[11] Patent Number: 4,512,860
[45] Date of Patent: Apr. 23, 1985

[54] CATHODIC ELECTROCOATING COMPOSITION COMPOUNDED WITH LATEX BINDER

[75] Inventors: Kirk J. Abbey, Cleveland, Ohio; James R. Erickson, Katy, Tex.; Barbara L. Kunz, Bay Village, Ohio

[73] Assignee: SCM Corporation, New York, N.Y.

[21] Appl. No.: 513,621

[22] Filed: Jul. 14, 1983

[51] Int. Cl.[3] ............ C25D 13/06; C25D 13/24
[52] U.S. Cl. .................. 204/181 C; 524/555; 428/500; 428/461
[58] Field of Search ............ 204/181 C; 524/555; 428/560, 461

[56] References Cited

U.S. PATENT DOCUMENTS

| | | | |
|---|---|---|---|
| 3,048,556 | 8/1962 | Miller | 260/29.7 |
| 3,671,412 | 6/1972 | Lohr | 204/181 |
| 3,799,854 | 3/1974 | Jerabek | 204/181 |
| 3,873,488 | 3/1975 | Gibbs et al. | 260/29.7 |
| 3,882,009 | 5/1975 | Wagener et al. | 204/181 |
| 3,994,792 | 11/1976 | Wagener et al. | 204/181 |
| 3,998,776 | 12/1976 | Wagener et al. | 260/20.6 SQ |
| 4,017,372 | 4/1977 | Wagener et al. | 204/181 |
| 4,032,420 | 6/1977 | Boldebuck et al. | 204/181 |
| 4,175,018 | 11/1979 | Gacesa | 204/181 T |
| 4,225,406 | 9/1980 | Wagener et al. | 204/181 C |
| 4,225,407 | 9/1980 | Wagener et al. | 204/181 C |
| 4,294,741 | 10/1981 | Bosso | 260/29.6 NR |
| 4,379,869 | 4/1983 | Siadat et al. | 523/206 |
| 4,380,601 | 4/1983 | Welsh et al. | 524/555 |
| 4,395,444 | 7/1983 | Das et al. | 427/388.4 |
| 4,399,254 | 8/1983 | Das et al. | 524/745 |

FOREIGN PATENT DOCUMENTS 3123536 12/1982 Fed. Rep. of Germany .

*Primary Examiner*—John F. Niebling
*Assistant Examiner*—B. J. Boggs, Jr.
*Attorney, Agent, or Firm*—A. Joseph Gibbons

[57] ABSTRACT

An improved cathodic electrocoating composition comprises an aqueous suspension of cation-active, film-forming, amino-stabilized synthetic latex binder particles characterized by being practically free of amino monomer and amino initiator fragments and containing not substantially more than about 15% of low molecular weight material including solvents based on the latex solids content.

12 Claims, No Drawings

CATHODIC ELECTROCOATING COMPOSITION COMPOUNDED WITH LATEX BINDER

This invention relates to an improvement in aqueous cathodic electrocoating composition, more particularly to same containing a suspension of film-forming synthetic latex particles, and electrocoating with said composition.

BACKGROUND OF THE INVENTION

The application of protective and decorative coatings in the nature of paint or varnish by electrophoretic deposition now is a large industry. Quite commonly such coating processes are called "electrocoating". U.S. Patent and Trademark Office Class 204, subclass 181, reflects the large growth of this technology in recent years.

Generally, in an electrocoating process of the type concerned here, one or more cathode workpieces and one or more counterelectrodes (anodes) are maintained for a short period of time in an electrical circuit with a dilute aqueous dispersion of film-forming paint binder, usually pigmented, between them. In most such coating operations a net unidirectional electric current is passed between these electrodes at fair voltage (e.g., 50+ V.). Generally such current is rectified ac current. This causes deposition of the coating on the electrodes (workpieces). Most frequently the binder dispersion is maintained as a bath in which the electrodes are at least partially immersed. Other methods for forming the electrical circuit also have been proposed, e.g., by showering the workpieces with continuous streams of the current-carrying aqueous coating dispersion.

Representative of the earliest practical electrocoating is that shown in Allan E. Gilchrist's U.S. Pat. No. 3,230,162 of 1966. More recently cationic or cathodic electrocoating has become popular. U.S. Pat. No. 3,799,854 and many subsequent patents involving the electrodeposition of blocked isocyanate and amino resins onto a cathodic workpiece, and the subsequent curing of the electrodeposited film into a crosslinked structure are representative of such cathodic electrocoating. These very practical techniques employ comparatively low molecular weight, structurally ionized resinous material as their fundamental paint binders for the electrocoating, in contrast to the instant latices made by emulsion polymerization.

That is not to say that the cathodic electrodeposition of synthetic latices has not been proposed before. Representative cathodic electrocoating proposals using synthetic latex binders include those of these U.S. Pat. Nos. 3,873,488; 3,882,009; 3,994,792; 3,998,776; 4,017,372; 4,225,406; and 4,255,407.

Synthetic latices made by emulsion polymerization as cathodic electrocoating binders have been regarded as having the inherent potential of possessing a number of desirable characteristics such as high coulombic efficiency, high molecular weight for various properties, crosslinkability if desired, low cost, and versatility of composition. However, general experience with the cathodic electrocoating of such latices has revealed a number of practical deficiencies such as blistering, bubbling, loss of electrical efficiency, film roughness, and the like. The most recent proposals about cathodic electrocoating of synthetic latices made by emulsion polymerization do cite good adhesion to the electrode and obtention of desirably thin films coupled with a reasonable shutdown of current. Many of the earlier proposals for electrodeposition of synthetic latices lacked these essential characteristics, and generally such proposals were related to anodic electrodeposition of latices rather than cathodic.

In a conventional emulsion polymerization for synthesizing a latex from unsaturated monomers a few percent of residual monomer often remains, and amino fragments from initiators often are present. "Amino" is used here in the broad sense to comprehend monomers and fragments having amino, guanadino and/or amidino functionality, and, in general, nitrogenous functionality that is basically-reacting in aqueous dispersion and has molecular weight not above 300. Significant concentrations of solvents often are included in conventional cathodic electrocoating formulations in various ways. Some recent cationic-active latices have been electrodeposited unpigmented and without solvents such as alkoxyalkanols, esters of same, and hydrocarbons such as naphtha or toluene. However, it appears that there has been no recognition in the art of cathodic electrocoating with film-forming cationic latex binders, pigmented or clear, of the critical importance of precluding or eliminating nearly all of the low molecular weight (e.g., about 300 or less) amino materials and restricting the solvent content of the film-forming composition.

Advantages of the instant invention over prior proposals about the cathodic electrodeposition of latex include good pumping stability, good electrical efficiency, suppression of blistering and bubbles, increased rupture voltage, and excellent smoothness of the deposited film.

BROAD STATEMENT OF THE INVENTION

The instant invention is an improved cathodic electrocoating composition comprising an aqueous suspension of cation-active, film-forming, amino-stabilized synthetic latex binder particles compounded for electrodeposition onto a cathodic workpiece that is receptive to same, e.g., a metal such as steel or phosphate-treated steel or other electrically conductive substrate. Such composition is characterized by being practically free of amino monomer and amino initiator fragments and containing no more than about 15% low molecular weight material (M.W. not in excess of about 300 including solvents) based on its latex solids content.

DETAILED DESCRIPTION OF THE INVENTION

The instant latex is prepared by emulsion polymerization of addition polymerizable materials in aqueous dispersion, preferably ethylenically unsaturated monomers. The latex should be film-forming on a cathode during the wet electrocoating operation, that is it should have a Tg of about $-40°$ to $+60°$ C. and preferably about $-10°$ to $+30°$ C. The latex is cation-active by virtue of being amino-stabilized. By this is meant that such cation activity is provided fundamentally by a small proportion of amino, amidino, and/or guanadino functionality that is structurally a part of the latex molecule and/or is sorbed onto the surface of the latex, as in the form of a surfactant having such functionality. Additional cation activity also can be imparted by, for example, beta hydroxyethyl quaternary ammonium functionality of the latex and/or such sorbed surfactant.

Representative nonionic monomer types useful for forming suitable latices include alkenyl aromatic compounds such as styrene compounds; derivatives of alpha-methylene monocarboxylic acids such as acrylic esters, acrylic nitriles, and methacrylic esters; derivatives of alpha-, beta-ethylenically unsaturated dicarboxylic acids such as maleic esters and unsaturated alcohol esters; conjugated dienes; unsaturated ketones; unsaturated ethers; and other polymerizable vinylidene compounds such as vinyl chloride and vinyl fluoride. Specific ethylenically unsaturated compounds useful for the instant latices include styrene, alpha-methylstyrene, para-methylstyrene, ethylstyrene, diethylstyrene, t-butylstyrene, vinylnaphthalene, hydroxystyrene, methoxystyrene, cyanostyrene, acetylstyrene, monochlorostyrene, dichlorostyrene, and other halostyrenes, methyl methacrylate, ethyl acrylate, butyl acrylate, hexyl acrylate, 2-ethylhexyl acrylate, lauryl methacrylate, phenyl acrylate, 2-hyroxybutyl acrylate, 2-hydroxybutyl methacrylate, 4-hydroxybutyl acrylate, and 4-hydroxybutyl methacrylate; acrylonitrile, methacrylonitrile, acrylonilide, ethyl alpha-chloroacrylate, ethyl maleate, vinyl acetate, vinyl propionate, vinyl chloride, vinyl bromide, vinylidene chloride, vinylidene fluoride, vinyl methyl ketone, methyl isopropenyl ketone, vinyl ethyl ether, 1,3-butadiene, and isoprene. Styrene units are especially desirable in copolymers for the instant service, not only because styrene is economical, but also because it helps to impart gloss to the cured coating.

Most of the foregoing nonionic monomers tend to form water-insoluble polymers, and they are usually copolymerized with monomers having hydrophilic character for the purpose of, amongst other things, crosslinking capability and/or providing the needed cation activity. Representative of such modifying monomers are hydroxyethyl acrylate, hydroxyethyl methacrylate, hydroxypropyl methacrylate, acrylamide, methacrylamide, and modified acrylamides such as diacetone acrylamide and diacetone methacrylamide, and dimethylaminoethyl methacrylate, diethylaminoethyl methacrylate, t-butylaminoethyl methacrylate, isopropylaminopropyl methacrylamide, dimethylaminopropyl methacrylamide.

Hydrophilic monomer units in the latex structure that are not charge-bearing, e.g., those having hydroxyl and/or acrylamide functionality, can be used in modest levels; typically they are broadly used to constitute between about 2 and about 30 weight percent of the resulting thermosetting latex polymer solids and advantageously about 5–15%. The charge-bearing hydrophilic monomers for making a latex structurally cation-active desirably are used in a proportion of no more than about 5% by weight of the latex polymer solids, and preferably they amount to 0.5% or even less. Thus the resulting latex, in spite of these modifications, can be considered hydrophobic.

Emulsion polymerization to make the latex generally is carried on in a reaction zone with agitation at atmospheric pressure using a temperature of about 25° to 90° C. Typically the monomers are charged gradually to an aqueous body which can contain all of the water or only an initial fraction of it, such fraction being augmented as the reaction continues. Initiator for the latex polymerization can be present initially in the aqueous body, and it also can be added concurrently with the monomer charge. So can surfactant if surfactant is to be used at all. A preferred latex preparation is a seeded semi-continuous emulsion polymerization wherein about 0.5–10% of the monomer is used to establish a polymerized seed population by emulsion polymerization, then the rest of the ingredients are added to the recipe to form polymer upon the seeds. Small amounts of surfactants such as fatty imidazolines, ethoxylated fatty guanidines (e.g. Aerosol C61, a trademark of American Cyanamid Company), nonionics such as highly ethoxylated octyl and nonyl phenols, ethoxylated fatty alcohols, and amine-functional polymeric surfactants also can be used if necessary or desirable. In the instant latices the concentration of oligomeric or polymeric starting material is quite low (not substantially above about 5%, e.g., from oligomeric or polymeric surfactant), the vast preponderance of the latex being provided by the monomers charged.

Conventional additives for latex compositions can be included in the emulsion polymerization recipe, and some can be added later. Such materials include chain transfer agents, shortstopping agents, buffers, antifoaming agents, chelating agents, plasticizers, tinting materials, and bactericides or other preservatives. In a preferred operation a heel of partially-reacted latex is used (thereby providing a preformed seed); additional water, the rest of the monomers and often additional surfactants and initiators then are the customary feeds in incremental or continuous fashion while the contents of the polymerization zone are agitated under conditions of temperature and pressure suitable for maintaining the polymerization. Preferably the temperature for the particular initiator system and polymerization is between about 70° and about 85° C. and the pressure is atmospheric, although higher pressures, and thus temperatures are possible. Advantageously the rate of monomer addition is low enough to control the rate of polymerization.

The initiators produce free radicals for the latex polymerization and can be, for example, certain redox systems such as: hydroxylamine hydrochloride in combination with t-butylhydroperoxide, azo types such as 2,2'-azobis(amidinopropane hydrochloride) ("AAP"), 2,2'-azobis isobutyronitrile ("AIBN"), 2,2'-azobis(2-isopropylimidazolium)dichloride, 2,2'-azobis(2-aminopropane)sulfate, or even an electron beam or gamma radiation. The latex is prepared at a polymer solids (NV) content that usually is at least about 35%, preferably about 40–60%, and even as high as about 70% in some cases. pH of a finished latex batch for the electrocoating purpose usually will be between about 1 and about 6, and generally will be between about 2 and about 5. For the electrodeposition process latex emulsions are diluted with water to a solids concentration generally not above about 25% and advantageously between 1 and 15%.

Latex particle size advantageously averages (weight average) between about 1000 Å and about 4000 Å although ones from 300 Å to 6000 Å are useable. By use of appropriate monomeric material in their preparations functionality can be incorporated into the molecular structures of the latex and the resinous pigment dispersant for rendering these structures crosslinkable with each other or self-crosslinking. Thus, for example, blocked isocyanate functionality so incorporated can be made to crosslink upon curing with labile hydrogen functionality such as hydroxyl, unhindered secondary amine, amide, and/or thiol functionality present. If both sorts of functionality are part of the same molecular structure, that structure will be self-crosslinkable; if one sort such as the blocked isocyanate is part of one structure and the other such as labile hydrogen is part of another polymer molecule, these diverse structures can be crosslinked with each other. Typical blocked isocyanate monomers for such use are, for example, 2-isocyanatoethyl methacrylate blocked with 2-butanone ketoxime or the adduct of either toluene diisocyanate or isophorone diisocyanate having one isocyanate group reacted with hydroxyethyl methacrylate and the other blocked with caprolactam or other blocking compound such as an oxime. A methylolacrylamide such as isobutoxy methylolacrylamide also can be used, but as such functionality generally crosslinks most satisfactorily with some acidity present and often tends to give appreciable microgel formation, blocked isocyanates are preferred. Hydroxy functional acrylates are the preferred labile hydrogen-providing materials for a polymerization.

Pigmentation is added most efficiently to a cathodic electrocoating latex formulation in the form of a pigment dispersion or "grind" containing resinous pigment dispersant that has molecular weight substantially lower than that of the latex (e.g., not substantially above about 20,000 for such dispersant as compared to at least about 50,000 and usually much higher for such latex—both weight averages).

Curiously, however, it has been found that only a limited proportion of resinous pigment dispersant can be electrodeposited with latex for effective crosslinking therewith before solvent resistance of the cured film will be markedly adversely affected. Thus, when a dispersant proportion amounts to no more than about 150% of the latex crosslinkable therewith, the solvent resistance of the cured film is lowered somewhat, but such loss usually can be tolerated. However, when an appreciably greater proportion of such dispersant is present, the solvent resistance of the cured film is very badly affected—unless the electrodeposit also contains some additional material, i.e., an external crosslinker, that will crosslink with at least the dispersant upon curing. Useful external crosslinkers include acid functional aminoplasts, e.g., melamine resins such as Cymel 1141, a trademark of American Cyanamid Company, or a blocked isocyanate such as isophorone diisocyanate blocked with epsilon caprolactam or other conventional blocking agent.

Solvent resistance of the cured film also can be obtained by use of such external crosslinker that has been codeposited with latex and resinous pigment dispersant that will not crosslink with each other, but will crosslink with such external crosslinker film component.

As noted above, adequate cation activity for the latex can be provided by a very small proportion of amino, amidino, and/or guanadino functionality that is structurally a part of the latex molecule and/or sorbed onto the surface of the latex. Polymerizing charge-bearing hydrophilic monomer units into the latex structure certainly is the positive way for imparting the needed cation activity thereto. It should be noted, also, that initiators such as 2,2′-azobis(amidinopropane hydrochloride) ("AAP") break down in use to provide structural amidino functionality in the polymer while the fatty imidazoline surfactants can supply useful amidino functionality for sorption onto the surface of latex having otherwise little or no cation activity. Similarly, ethoxylated fatty guanadine surfactants can impart guanadino functionality to the surface of such latices for rendering or helping to render them adequately cation active.

Suitable resinous pigment dispersants (pigment grind vehicles) for the instant invention will have functionality that is crosslinkable with that of a latex or an external crosslinker. Advantageous resins for such service include acrylic resins having some hydroxyl functionality and average mol weight of about 2000 to 5000, and epoxy resins modified with an amine, such epoxy resin having average mol weight of about 800–1600. An electrocoating binder of the present invention ordinarily will be predominantly latex with the crosslinkable pigment dispersant being from about 0.1 to 40% and preferably about 5 to 30% of the binder and the external crosslinker if needed, being about 5 to 30% and preferably about 5 to 25% of the binder.

Customarily the wet electrocoated part is drained, blown with air to remove loosely adhering liquid, and/or rinsed. Advantageously the final rinse is with deionized water. Rinsing also can be done with a permeate from ultrafiltration of an electrocoat bath. Initial rinsing can be done with an aqueous dispersion recovered from later rinsing, e.g., from the final rinse.

Cure of the wet electrodeposit to its final dry and hardened state generally is done by baking the coated article at about 120° to 230° C. for 5 to 40 minutes, although radiation curing also is possible, e.g., by electron beam, gamma radiation, or by ultraviolet light if a sensitizer is incorporated into the film and the light is not masked by pigmentation. Air-dry (at room temperature) films also are possible in some cases, generally where service requirements are not as rigorous.

Pigmentation for the electrocoating composition typically can be provided by mixing therein pigments such as titanium dioxide, iron oxides, lead chromate, carbon black, cadmium yellows and reds, clay, silica, talc, phthalocyanine blue, chromium yellow, aluminum flake, and other conventional pigmentary materials and even fine particles of hard polymer or resin, some of which can be caused to fuse upon curing or even to crosslink with other electrodeposited materials if desired. While such pigmentary materials usually form a minor proportion of the paint solids that are to be electrocoated, they can on occasion constitute a major proportion, especially where a plastic pigment fuses and/or reacts upon curing to give additional binding to the particles present. Pigments, particularly mineral pigments, usually are added to the electrocoating composition in the form of a pigment grind using a resinous vehicle that has molecular weight substantially below that of the latex.

Counterions for amino functionality in the coating composition are provided in the composition by acids such as formic, acetic, lactic, and/or phosphoric acids. pH of a typical composition of this invention for the instant pigmented cathodic electrocoating will be between about 3 and about 6, and generally it is advantageous to be about 4 to 5, with about 1 meq. of acid per meq. of base present.

The presence of solvents such as alkoxyalkanols, hydrocarbons such as a naphtha or toluene, or an acetate such as butyl acetate tends to lower the rupture voltage of the electrodeposited latex film. Hence, little or no solvent is preferred in manufacture of the latex, and any solvent concentration in the electrocoating composition, based on weight of nonvolatile matter, best is limited to about 15% by weight, maximum. Such solvent customarily is introduced into a formula with a pigment grind.

Desirably the free monomer in the latex, and, thus, in the cathodic electrocoating composition, is maintained very low. By using one or more clean-up procedures at the end of the latex polymerization, one can accomplish this. One such procedure is to treat the latex finally with a series of successive small initiator additions and to raise the final temperature for reacting virtually all of the free monomer present, if not all. Other useful techniques include adding a small proportion of highly reactive monomers such as an acrylate to combine with, for example, free vinyl acetate, or to stop a styrene feed near the end of the latex-making reaction (because such monomer can inhibit the complete polymerization of other less reactive monomers present). Vacuum stripping is an alternate method of free monomer removal. Gas chromatography is useful for determining the level of residual monomer, which desirably is not more than about 2% and is preferred to be much less.

For the highest quality of cathodic electrodeposition desired here it is especially important to remove amino monomers and amino initiator fragments, which can impart roughness to a cathodically-electrodeposited film of the latex; "amino" is used here in the broad sense to comprehend monomers and fragments of molecular weight not above 300 and having amino, guanadino, and/or amidino functionality, and, in general, nitrogenous functionality that is basically-reacting in aqueous dispersion. When such monomer is fully reacted, it is effectively sequestered. Ion exchange of the latex with an ion exchange resin in acid form is useful for eliminating virtually all of the free amino monomer and amino initiator fragments; these should not be substantially above about 0.1% of the latex solids.

The ion exchange desirably is done by passing the aqueous dispersion of latex through a column of strongly acidic ion exchange resin particles, e.g., a polystyrene/divinyl benzene nuclear sulfonic acid type that is macroreticular. Advantageously the flow is upwardly through a bed. Alternatively, particles of such ion exchange resin can be stirred in the aqueous latex, then separated, repeating the operation as needed. This, however, is not as efficient as the column method for removing minute amounts of the amino material. It usually is desired to perform the ion exchange treatment on the latex at a substantially high concentration, e.g., as customarily manufactured; for speed of flow through a bed this usually requires modest pressure and equipment therefor. Alternatively, the latex can be thinned with water towards or reaching electrocoating bath concentration, then exchanged.

Other treatment useful for removing amino monomers and amino fragments from latices here include dialysis, electrodialysis, and reverse osmosis.

As mentioned above, an electrocoating bath composition here advantageously will contain about 1 to 15% by weight of solids. The replenishment feed composition for an instant cathodic electrocoating bath will have greater concentration than this, and it can reach 50-60% of such solids. By using a replenishment composition deficient in acid relative to ionizable amino, guanadino, and/or amidino groups in such replenishment composition, one can help to keep the buildup of acid in an operating bath under control. The bath also can be purged by use of membranes which will permit bath components to be withdrawn quite selectively as by ultrafiltration.

The following examples illustrate the invention, but should not be construed as limiting it. In this specification all percentages are weight percentages, all parts are parts by weight, and all temperatures are in degrees C. unless otherwise expressly indicated. In the examples, the electrocoating test tank held a liter of paint dispersion. The stainless steel tank was divided into a larger dipping section and a smaller agitator section by a vertical wier to one side that fixed the depth of the painting bath. The wier was short of the bottom of the tank to permit recirculation of bath dispersion from the agitator section into the bottom of the dipping section. Paint dispersion flowed over the wier into the agitator section, then was impelled downwardly by a propeller-type agitator into the bottom of the dipping section. This created a circulation of the paint dispersion with a level top surface in the dipping section. A 4"×4" (10.2 cm.) conventionally phosphated (Parker Bonderite 1000 iron phosphated) 20 ga. (0.95 mm.) steel panel was lowered over about 9 seconds to a depth of 3½" (8.9 cm.) with power on, the immersion being made about centrally to the wall confines of the dipping section of the tank. The tank was charged as an anode and the panel as a cathode with constant voltage impressed therebetween. Power was left on for 64 seconds after a panel was fully immersed, then turned off and the wet coated panel withdrawn from the bath. It was rinsed with deionized water. Unless otherwise specially noted each panel was baked for 20 minutes at 163° to cure the resulting wet electrodeposited film.

The electrocoating process was very rapid. The wet coating was substantially complete in a few seconds after a panel had been immersed to the final depth (usually with attendant virtually complete shutoff of current in the circuit).

Unless otherwise indicated expressly the electrocoating was done as follows: for each coating composition tested a panel was electrocoated from a 25° C. bath at the following constant voltages: 100, 150, 200, and 250; and from a 45° C. bath at voltages of 200, 300, 400, and 500; the last voltage caused rupture of wet films.

EXAMPLES 1-4

Cation-active latex was prepared according to the following recipe:

| Group | Ingredients | Parts Per 100 Parts of Monomer |
|---|---|---|
| A | Deionized Water | 228.8 |
| | Triton X-405 Surfactant[1] | 1.4 |
| | Alkazine-O Surfactant[2] | 0.7 |
| | H$_3$PO$_4$ (85.6% solution in water) | 3.6 |
| B | Butyl Acrylate ("BA") | 49.6 |
| | Styrene ("S") | 37.7 |
| | N,N—Dimethyl-2-Aminoethyl Methacrylate ("DMAEMA") | 4.2 |
| | Hydroxypropyl Methacrylate ("HPMA") | 8.7 |
| | 2,2'-azobis (isobutyronitrile) ("AIBN") | 0.8 |
| | n-Dodecyl Mercaptan ("DDM") | 0.2 |
| C | AWC Rice[3]/Water | 0.01/0.34 |
| | t-Butyl Hydroperoxide/Water ("t-BHP") | 0.01/0.34 |

[1]The trademark of Rohm & Haas Company for the nonionic surfactant ethoxylated octylphenol having an average of 40 mols of ethylene oxide per mol of the phenol.
[2]The trademark of Alkaril Chemicals, Ltd. for a strong base oleic hydroxyethyl imidazoline surfactant, molecular weight about 394, specific gravity 0.95, boiling point >200° F., open cup flash point >300° F.
[3]The trademark of Diamond Shamrock Corporation for Sodium Formaldehyde Sulfoxoxylate.

The Group A ingredients were charged to an agitated reactor protected from oxygen with nitrogen gas and brought to 83° reaction temperature. About 10% of the group B ingredients (monomer with initiator) was added and reacted. Then the remainder of the group B was added at constant rate over a period of about 3 hours. Group C ingredients were added about 1½ hours after the monomer feed was complete. The batch was held at reaction temperature for about ½ hour, then cooled to room temperature.

Part of the latex was cation-exchanged at room temperature stirring in and filtering off Amberlite 200C resin in acid form to remove therefrom virtually all amine monomer fragments and amino monomers that are readily neutralized by such resin. Amberlite 200C is the trademark of Rohm & Haas Company for a macroreticular strongly acidic styrene/divinylbenzene ion exchange resin having the following properties; apparent wet density of 0.8; shipping weight 50 lbs./cubic ft.; effective size approximately 0.6/mm. diameter; and moisture content approximately 48%. The ion exchange treatment also removed part of the strongly basic imidazoline surfactant. (For Example 3 this high molecular weight surfactant was replenished after the ion exchange.) Number average particle size of the latex was about 1300 Å, as determined by turbidity.

EXAMPLE 1

Latex as made, but not ion-exchanged, was diluted with deionized water to 5% solids and electrocoated onto cathode panels as described above.

The cured coating averaged about 1.5 mils (0.037 mm.). The coating was bubbly and showed evidence of secondary deposition wet and dry (thickened, roughened areas, frequently to the center of the panels). Its wet adhesion to the panels was poor. Shutoff of current (residual current) after initial surge of deposition was poor.

EXAMPLE 2

Example 1 was repeated except with ion-exchanged latex. Ion exchange loss of some of the imidazoline surfactant raised the surface tension of the latex. Wet and dry, the film appearance was very uniform and perfect without evidence of secondary deposition. Wet adhesion was good, and the shutoff of current, after the initial surge of deposition, was virtually complete.

EXAMPLE 3

Example 2 was repeated except that the imidazoline surfactant lost was replenished after the ion exchange. The results were like those of Example 2.

EXAMPLE 4

Example 2 was repeated except that 4.2 parts of DMAEMA per 100 parts of monomer charged were dosed into the latex after the ion exchanging to demonstrate the effect of low molecular weight amino material on the electrocoating. Cured film thickness averaged about 1.5 mils (0.037 mm.). The coating results were poor, like those of Example 1.

Examples 1 and 4 show the deleterious effect of the presence of low molecular weight amino materials in the latex for electrodeposition. The presence of the higher molecular weight imidazoline surfactant in normal useful proportion is shown by Example 3; it was not detrimental.

EXAMPLES 5-6

Latex was prepared from the ingredients tabulated below by the method described in Examples 1-4 except that: no Alkazine-O surfactant was employed; the initiator used was 2,2'-azobis(2-amidinopropane hydrochloride) ("AAP"); ⅓ of such AAP was charged with the initial (10%) charge of the group B ingredients; the feeding of the other ⅔ of the AAP was added simultaneously with the feeding of the remaining 90% of the group B ingredients.

| Group | Ingredients | Parts Per 100 Parts of Monomer |
|---|---|---|
| A | Deionized Water | 137.5 |
|   | Triton X-405 Surfactant[1] | 1.4 |
|   | $H_3PO_4$ (85.6% solution in water) | 0.2 |
| B | Butyl Acrylate ("BA") | 51.7 |
|   | Methyl Methacrylate ("MMA") | 19.2 |
|   | Styrene ("S") | 20.0 |
|   | N,N—Dimethyl-2-Aminoethyl Methacrylate ("DMAEMA") | 0.2 |
|   | Hydroxypropyl Methacrylate ("HPMA") | 8.6 |
|   | n-Dodecyl Mercaptan ("DDM") | 0.2 |
| C | 2,2'-azobis (2-amidinopropane hydrochloride) ("AAP") | 0.3 |
|   | Deionized Water | 12.5 |

[1]The trademark of Rohm & Haas Company for the nonionic surfactant ethoxylated octylphenol having an average of 40 mols of ethylene oxide per mol of the phenol.

Average particle size (number average) of the latex was about 2600 Å determined by turbidity.

Electrocoating baths were made at 5% solids ("NV") from this latex and deionized water. The bath of Example 5 was made with the latex immediately above as synthesized, that of Example 6 with the same latex, but it had been ion-exchanged in the manner of the latices used for the baths of Examples 2, 3, and 4.

EXAMPLE 5

The film thickness of the cured coatings averaged about 2 mils (0.054 mm.). The film appearance was fairly good, but the wet adhesion of the coating was only fair.

EXAMPLE 6

The film thickness of the cured coatings averaged about 1 mil (0.025 mm.). The film appearance was excellent, with absolutely no trace of any secondary deposition, and the wet adhesion of the coating was good.

EXAMPLES 7-10

The effect of about ·15% of solvent based on the weight of latex on the cathodic electrocoating of the ion-exchanged latex of Example 2 is illustrated in the examples below. (A 5% solids bath of this latex produced films with rupture voltage at 25° that was in excess of 250 V.) The electrocoat bath formulations and the application voltage at which rupture occurred was as follows:

| Ingredient | 7 | 8 | 9 | 10 |
|---|---|---|---|---|
| Latex of Example 2, prepared at 30.5% NV | 246 | 246 | 246 | 246 |
| 2,2,4-Trimethyl pentanediol-1,3 monoisobutyrate | — | — | 7.5 | — |
| 2-Hexoxyethanol-1 | — | 7.5 | — | — |
| Cyclohexanone | 11.2 | — | — | — |
| Pine Oil | — | — | — | 7.5 |
| 2-Butoxyethanol-1 | — | 3.8 | 3.8 | 3.8 |
| Deionized Water | 1240 | 1240 | 1240 | 1240 |

-continued

| Ingredient | Example No. | | | |
|---|---|---|---|---|
| | 7 | 8 | 9 | 10 |
| Voltage at which rupture occurred | 200 | 150 | 150 | 200 |

EXAMPLES 11–20

Cation-active latices were prepared according to the following recipes:

| Group | Ingredients | Parts per 100 Parts of Monomer | | | |
|---|---|---|---|---|---|
| | | Latex I | II | III | IV |
| A | Deionized Water | 134.1 | 134.3 | 134.3 | 88.3 |
| | Triton X-405 Surfactant[1] | 0.1 | 0.1 | 0.1 | 0.1 |
| | $H_3PO_4$ (85.6% solution in water) | 0.1 | — | — | 0.1 |
| | $H_3PO_4$ (20% solution in water) | — | 0.6 | 0.6 | — |
| B | "BA" | 1.1 | 0.7 | 0.7 | 0.7 |
| | "MMA" | 0.9 | 1.3 | 1.3 | 1.3 |
| C | "AAP" | 0.1 | 0.1 | 0.1 | 0.1 |
| | Deionized Water | 4.2 | 5.1 | 5.1 | 4.2 |
| D | "BA" | 50.7 | 48.9 | 48.9 | 50.8 |
| | "MMA" | 38.5 | 31.5 | 35.5 | 38.3 |
| | N—tertiary Butylaminoethyl Methacrylate ("TBAEMA") | 0.2 | — | — | — |
| | "DMAEMA" | — | 0.2 | 0.2 | 0.2 |
| | "HPMA" | 8.6 | 6.54 | 6.54 | 8.6 |
| | "DDM" | 0.2 | — | — | 0.2 |
| | Methylethyl Ketoxime blocked 2-Isocyanatoethyl Methacrylate ("B-IEM") | — | 10.9 | 10.9 | — |
| | $CBr_4$ | — | 1.2 | 1.2 | — |
| E | Deionized Water | 8.3 | 11.4 | 11.4 | 8.3 |
| | "AAP" | 0.2 | 0.2 | 0.2 | 0.2 |
| | Triton X-405 Surfactant[1] | 1.4 | 1.3 | 1.3 | 1.4 |
| F | Deionized Water | — | 0.3 | 0.3 | — |
| | Dowicil 75, the trademark of Dow Chemical Company for a bactericide | — | 0.05 | 0.05 | — |

[1]The trademark of Rohm & Haas Company for the nonionic surfactant ethoxylated octylphenol having an average of 40 mols of ethylene oxide per mol of the phenol.

Weight average particle size of these latices was determined by disc centrifuge photosedimentometer (U.S. Pat. No. 4,311,039). For Latex I, particle size was 4600 Å; for latex II, 5800 Å; for Latex III, 4700 Å; for Latex IV, 4300 Å.

The group A ingredients were charged into an agitated reactor protected from oxygen with nitrogen gas and brought to the 75° reaction temperature. The group B ingredients were added, and after about 5 minutes, the group C ingredients. This was followed by a 4-hour addition of the group D ingredients and, starting simultaneously with those ingredients, a 5-hour addition of the group E ingredients for Latex I and a 4½-hour addition for the other three. After the addition of the group E ingredients had been completed, the mixture was held at 75° with agitation for about 1 hour, then cooled to room temperature. The latex solids content of a dispersion ("NV") can be determined from the weight remaining after evaporating volatile matter at 125° C. for 30 minutes from a thin film of sample inhibited against further polymerization with hydroquinone. After cooling and before filtering through a 200-mesh U.S. standard sieve made of stainless steel the group F ingredients were added as indicated to Latices II and III.

Continuous ion exchange operations were conducted at room temperature by forcing cation-active electrocoating latex suspension at various solids ("NV") contents upwardly through a bed of the same kind of ion exchange resin as that used in Examples 2, 3, and 4. The ion exchange resin was retained in a Michel-Miller column that had packed height of 30 cm. and inside diameter of 22 mm. Maximum effective flow rate for "cleaning" the latex suspension adequately for cathodic electrocoating was about 15 cc. per minute. Surprisingly, such rate appeared to be substantially independent of latex concentration.

In such latex, having no removable cationic surfactant, the surface tension of the latex dispersion being processed did not change appreciably. This indicated that the cations removed were not particularly surface active. In the cases where some cationic surfactant is removed, the original concentration of such surfactant can be restored after the exchanging if necessary or desired, advantageously with surfactant having molecular weight in excess of about 300 for precluding secondary deposition of the latex in a cathodic electrocoating operation.

Sufficiency of cation removal (cleaning) was checked by cathodically electrodepositing a latex film on a panel from a 5% latex solids concentration bath in the manner similar to that described in connection with the previous examples, then visually inspecting the wet and the heat-cured electrodeposited films for evidence of secondary deposition.

Secondary deposition usually appears on a test panel as thickened, roughened spots, areas or bubbles, often near the middle of the panel, and makes for a rejectable finish.

The total base activity (alkalinity) of a latex can be ascertained by fully neutralizing a dissolved sample. The ion-exchanging of Examples 11-20 removed about 60–65% of such total base activity; the portion thus removed by the ion exchange might be considered loosely-bound or unbound (e.g., cation-active monomers of low molecular weight, e.g., <300 molecular weight material, and initiator fragments) as distinguished from cation-active functionality that is structurally part of the latex or is strongly sorbed thereonto. Additionally, such removed material properly can be considered for the most part as being that which is not deep in the latex particle, but rather is on or near the latex particle surface or apart therefrom.

In Examples 16-20 the latices herein the total titratable base activity was 0.045 meq. per gram of latex solids. Removal of 0.028 to 0.030 meq./gm. of such activity was obtained by the ion-exchanging, indicating practically complete removal of small molecules of base. However, when only 0.020 meq./gm. was so removed (at too high a flow rate through the ion-exchanger column), no electrodeposition of coating occurred upon a panel. (Conductimetric titration appears to be a possible method for ascertaining effective "cleanliness" of the cation-active latex for the instant cathodic electrodeposition purposes, at least when the latices tested are quite similar in recipe and a plurality of base activity values that provide and avoid secondary deposition have been ascertained.) The following table summarizes data taken in ion-exchange experiments with Latices I, II, III, and IV.

| Example No. | Latex No. | Latex Concentration NV, % fed to ion exchanger | Flow Rate Ml./Minute through bed | Base Activity, Meq./Gm. of Latex Solids Removed by ion-exchange* | Secondary Deposition |
|---|---|---|---|---|---|
| 11 | I | 5 | 8.9 | | None |
| 12 | I | 5 | 17.3 | | None |
| 13 | I | 5 | 31.1 | | Slight |
| 14 | II | 10 | 13.3 | | None |
| 15 | III | 25 | 12.2 | | None |
| 16 | IV | 40 | 0.7 | 0.030 | No coating data taken |
| 17 | IV | 40 | 1.7 | — | None |
| 18 | IV | 40 | 6.8 | — | None |
| 19 | IV | 40 | 14.2 | 0.028 | None |
| 20 | IV | 40 | 28.8 | 0.020 | No coating deposited |

*The estimated error in the base activity removed was ±0.001.

The instant patent application is related to the following commonly-assigned patent applications of even date herewith, the disclosures of which are incorporated herein expressly by reference: Ser. No. 513620; and Ser. No. 513619.

What is claimed is:

1. In a method for electrocoating an electrically conductive surface serving as a cathode in an electrical circuit comprising said cathode, an anode, and an aqueous electrodepositable composition wherein net unidirectional electric current is passed through said circuit for causing deposition of said composition on said cathode, the improvement which comprises using as said composition an aqueous suspension of cation-active, film-forming, amino-stabilized synthetic latex binder particles characterized by being practically free of amino monomers and amino initiator fragments and containing not substantially more than about 15% low molecular weight material including solvents based on the latex solids content.

2. An article coated by the method of claim 1.

3. A process for improving the electrodeposition of film-forming, cation-active, amino-stabilized synthetic latex which comprises removing therefrom cation-active low molecular weight material by contacting an aqueous dispersion of said latex with ion exchange resin in acid form.

4. The process of claim 3 wherein a flow of the latex dispersion is passed through a bed of cation-exchanged resin particles.

5. The process of claim 3 wherein said latex for the ion-exchanging contains cationic surfactant that is removed thereby, and, after said exchanging, the resulting treated latex is dosed with additional cationic surfactant having molecular weight in excess of about 300.

6. The method of claim 1 wherein said latex is a copolymer containing acrylate and/or methacrylate monomer units and is structurally cation-active by its containing monomer units that have secondary and/or tertiary amino functionality.

7. The method of claim 1 wherein said latex has been treated to remove amino monomer and amino initiator fragments.

8. The method of claim 7 wherein said latex has been ion exchanged with a strongly acidic ion exchanger.

9. The method of claim 1 wherein said aqueous electrodepositable composition contains polyether surfactant.

10. The method of claim 1 wherein said aqueous electrodepositable composition is acid-ionized, contains about 1-25% binder solids, and the latex present therein has average particle size not substantially smaller than about 1000 Å.

11. The method of claim 1 wherein said aqueous electrodepositable composition is replenished with a replenishment composition that is like said aqueous electrodepositable composition except that it is richer in binder solids and lower in acid than is said aqueous electrodepositable composition.

12. The method of claim 1 wherein said aqueous electrodepositable composition includes particulate material in the form of inorganic particles, plastic particles, and/or powder paint.

* * * * *